United States Patent [19]

Beck

[11] Patent Number: 4,601,823

[45] Date of Patent: Jul. 22, 1986

[54] EASILY ATTACHABLE, PIPE MOUNTED MAGNET FOR TREATING LIQUIDS TO PREVENT SCALING DEPOSITS

[76] Inventor: William D. Beck, 1134 Glenn Ave., Columbus, Ohio 43212

[21] Appl. No.: 734,155

[22] Filed: May 15, 1985

[51] Int. Cl.⁴ .................. B01D 35/06; B03C 1/02; B03C 1/30; C02F 1/48
[52] U.S. Cl. .................. 210/222; 422/186.01
[58] Field of Search .................. 422/186.01, 186.02; 210/222, 223

Primary Examiner—John F. Terapane
Assistant Examiner—Susan Wolffe
Attorney, Agent, or Firm—Frank H. Foster

[57] ABSTRACT

An improved magnetic device for subjecting a liquid flowing through a pipe to a magnetic field in order to reduce subsequent crystalization of inorganic compounds. The device may be installed very easily and without first severing a pipe of an existing installation and provides a homogeneous magnetic field of high flux density. It has a housing with a central pipe-receiving passage and a slot extending from the passage through the periphery so that the pipe may be positioned in its passage. A plurality of magnets are contiguously arranged within the housing to surround most of the pipe except at the slot. A keyway is formed at the slot so that a key magnet body may be slid into the housing parallel to the pipe.

6 Claims, 3 Drawing Figures

EASILY ATTACHABLE, PIPE MOUNTED MAGNET FOR TREATING LIQUIDS TO PREVENT SCALING DEPOSITS

TECHNICAL FIELD

This invention relates generally to devices for applying a magnetic field to a pipe in order to treat a liquid solution flowing through the pipe to change its ionic electrical charge and its crystalization properties to thereby reduce the deposit of scaling in the liquid carrying apparatus and more particularly the invention relates to a device of that nature which may be easily mounted to encircle a pipe which is already installed and functioning in a system without the necessity of first severing the pipe.

BACKGROUND ART

For years it has been known that the crystalization of certain solutions which forms deposits in various solution conveying conduits and passageways can be substantially reduced by passing the solution through a strong magnetic field. A major use of this nonchemical phenomenon has been the application of these principles to the reduction of scaling in water conveying systems due to the crystalization of dissolved minerals such as calcium carbonate. The mechanism causing such a change in the crystalization properties of the solution is not well understood and is the subject of some dispute. But, nonetheless, it is well recognized that the magnetic treatment is effective, although its effect is temporary, lasting on the order of two to thirty six hours.

In order to maximize the effectiveness of such magnetic treatment, it is desirable that the magnetic field have a very high flux density and be homogeneous throughout the liquid solution as it passes through the pipe. In most of the prior art devices this has been accomplished by annular magnets or other magnets which permanently surround a segment of pipe and are permanently mounted to the pipe. These units are retrofit in existing installations by cutting a segment from a pipe and connecting the magnetic treatment segment to the existing pipe by means of couplings.

Although such units are effective, a substantial problem exists because of the need to sever a segment of pipe from an existing installation. Not only does that involve a more major effort by skilled installers or plumbers, but, in addition, requires the need for draining pipes, shutting off the system and in industrial systems, produces a substantial length of down time during which the industrial process cannot operate. Understandably, the severing of a pipe in a system of an operating business, such as a motel, causes significant apprehension in the minds of the management who are therefore not as likely to seek the advantages of the magnetic treatment of the water.

There have been a few structures suggested for mounting suitable magnets around a pipe without the need to sever the pipe. These typically utilize one or more bar magnets which are held in position against the pipe by one or more surrounding straps or clamps. A difficulty with this approach, however, arises because of the major forces which are required to bring a series of magnets together. When magnets brought into close association all aligned at the same polarity so that their magnetic fields are additive, they all repel each other. They are difficult to bring together and hold in position while a suitable support is fastened to them to retain them in position. As a result, existing devices have utilized magnets which are spaced around the pipe and are not contiguously joined. This means that the total magnetic flux density with those devices is less than it might otherwise be and results in nonhomogeneous regions within the pipe. This has a deleterious effect upon the treatment because it is desirable that all molecules of the solution be treated uniformly and with a strong field in order to maximize the anti-crystalization effects.

There is therefore a need for a device for magnetically treating the water which can be retrofit around a pipe without severing the pipe or to otherwise interfering with the operation of the system in which it is installed.

There is further a need for such a device which can provide a maximum flux density essentially uniformly throughout the pipe diameter and which can be relatively easily mounted about the pipe and held securely in place.

BRIEF DISCLOSURE OF INVENTION

The invention is a housing with a passageway for receipt of the pipe and formed with a slot extending from the periphery of the housing to the passageway so that the housing may be moved radially into position on the pipe without severing the pipe. The slot is formed to include a keyway extending generally longitudinally of the pipe. A plurality of magnets are contiguously arranged within the housing around the pipe and side by side extending from one side of the slot through the housing and around the pipe to the opposite side of the slot. After the housing has been positioned around the pipe, a key magnet body is slid into the keyway in a direction substantially parallel to the pipe. It is matingly received in the keyway contiguous to its neighboring magnets so that the pipe is continuously encircled by magnets which are preferably radially polarized.

Figure 1:
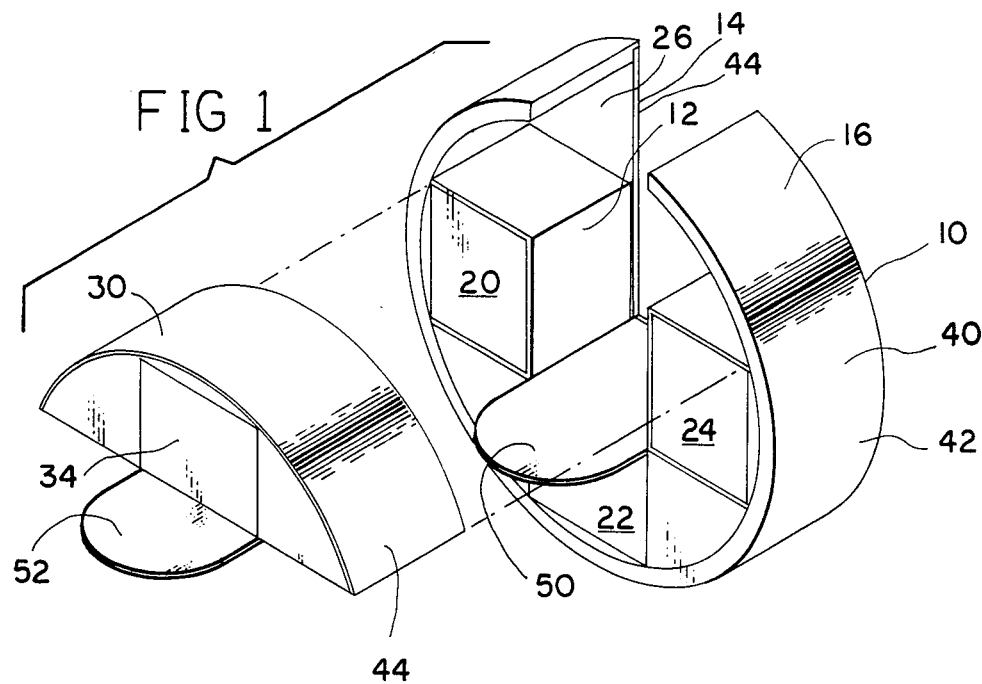
FIG. 1 is an exploded view in perspective illustrating the preferred embodiment of the invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

Figure 2:
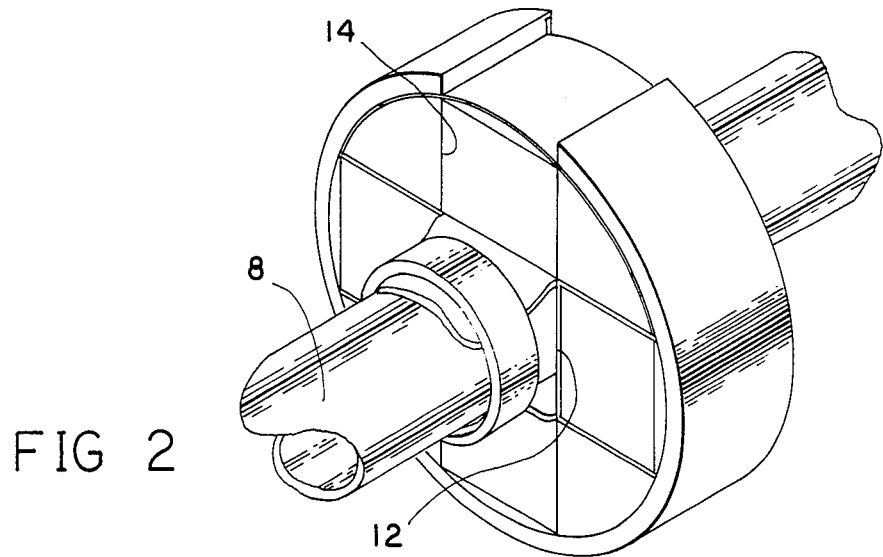
FIG. 2 is a view in perspective of the embodiment illustrated in FIG. 1, but assembled in operable position upon a pipe.
Figure 3:
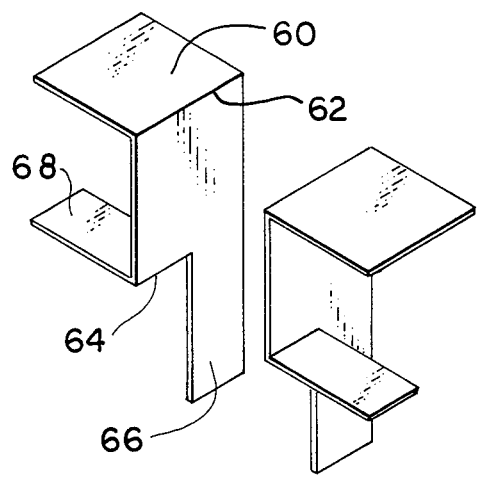
FIG. 3 is a view perspective revealing the interior support frame for supporting the magnets within the housing.

FIGS. 1 through 3 illustrate an improved apparatus for treating a liquid flowing through a pipe 8 to reduce subsequent crystalization of inorganic compounds in the liquid. The apparatus has a housing 10 which a passage 12 along a longitudinal axis of the housing 10 for receipt of the pipe 8. The housing 10 also has a slot 14 which extends from the outer periphery 16 of the housing 10 the passage 12. This slot permits the housing and the structures it contains to be moved radially onto the pipe 8. Three magnets, 20, 22 and 24 are contiguously arranged within the housing in side by side arrangement from one side of the slot 14 around within the housing 10 to the opposite side of the slot 14. The interior surface of these magnets define the walls of the passage 12. All of the magnets are polarized radially of the pipe and in the same radial direction so that the magnets are additively polarized with the south magnetic poles radially inwardly facing.

The slot 14 is additionally formed to include a keyway 26 which extends generally longitudinally with respect to the pipe 8. The keyway is the void or cavity extending laterally in opposite directions from the slot 14 within the housing.

A key magnet body 30 is slidable longitudinally into the keyway 26. The keyway, which is formed by generally longitudinal shoulders, restrains the key magnet body 30 against radial movement out of the housing 10 and away from the pipe. The key magnet body 30 is formed to include a key magnet 34 which is aligned so that it is polarized like the other magnets 20–24 after its insertion into the keyway. The keyway is arranged so that the key magnet 34 becomes contiguous to the other magnets 20–24 after it is slid into the keyway. The result is a plurality of magnets which contiguously encircle the pipe 8 and are all polarized in the same radial direction.

Preferably, all four magnets are permanent ceramic magnets and are assembled in abutting arrangement whereby an edge of one magnet abuts near one edge of its neighbor. Each magnet can be made wider than the pipe diameter by the amount of an overlap of its neighbor so that the magnets will neatly surround the pipe in overlapping arrangement.

Desirably a pair of longitudinally extending tabs are attached, one tab 50 to the magnet in the housing 16 and the other tab 52 to the magnet on the key magnet body 30. After an embodiment of the invention with such tabs is mounted on the pipe, a circular hose clamp or similar clamp may be drawn tightly around the tabs as illustrated in FIG. 2 so that the embodiment of the invention will not slide along the pipe. This is particularly useful for attachment to vertically oriented pipes.

Referring now to FIG. 3, there is illustrated a supporting frame for holding the magnets within the housing during manufacture of the device. The support frame may be made of two strips of non-ferrous metal which are bent to form the supporting frame. For example, the support frame 60 is a strip which is bent downwardly at bend 62 to extend downwardly to bend 64. At bend 64 the strip is bifurcated, one leg 66 extending downwardly further and the other leg 68 extending back parallel to the initial strip portion. The entire leg is then soldered or otherwise suitably attached to the housing walls. The magnets may then be inserted and any packing or potting compound may be inserted in the remaining spaces.

Preferably the housing 16 includes an outer peripheral shell 40 which terminates at the slot and defines a pair of voids in the housing extending laterally outwardly in opposite directions from the slot 14 to form the keyway 26.

Desirably this outer shell 40 includes a generally circular, ferromagnetic band 42 housing an end plate 44 attached to the peripheral shell 40 and extending across it except for the slot 14 and passage 12 so that the end plate will not interfere with installation of the invention onto a pipe.

The retaining shell 40 and the rest of the housing serve to help hold the magnets in close contiguous association with each other and around the pipe to retain it against the repelling forces of the magnets.

In addition, by forming the outer retaining shell 40 of a ferromagnetic material, such as iron, a low reluctance flux path is provided which results in increased magnetic flux within the water passing through the pipe.

A major advantage of the present invention is that it provides magnets which contiguously encircle the pipe after installation, yet may be installed without the need to sever the pipe. To install an embodiment of the present invention, the housing containing the magnets surrounding the pipe passageway is moved radially of the pipe until the pipe is passed through the slot into the pipe receiving passageway. The key magnet body 30 is then inserted in its keyway and forced parallel to the pipe into its final position.

A major advantage of the invention is that the key magnet body, to the extent it is repelled radially outwardly by the magnetic forces, is retained in position by use keyway in the housing and therefore it is not necessary that the installer apply a large force to hold the magnet against outward movement by these forces after it is in position. The installer merely forces the key magnet body into the slot parallel to the body without even any need for tools. when the key magnet is in position, the repelling force applied to it by the other magnets in a longitudinal direction parallel to the pipe becomes essentially zero. It may be retained in position by a retaining pin.

The present invention minimizes or even eliminates the manual fumbling and holding of multiple magnets together while their retaining structure is secured.

Embodiments of the present invention can be installed without severing the pipe and causing a stopping of a commercial operation utilizing the pipe. In addition, a customer may be skeptical of a salesman selling a magnetic treatment for water. Applicant's invention enables the customer to conveniently try the device without risk, without down time and if the customer is not satisfied the device may be removed leaving no permanent change in the customer's system.

While certain preferred embodiments of the present invention have been disclosed in detail, it is to be understood that various modifications may be adopted without departing from the spirit of the invention or scope of the following claims.

I claim:

1. An improved apparatus for magnetically treating liquid flowing through a pipe to reduce subsequent crystalization of inorganic compounds in the liquid, said apparatus comprising:
    (a) a housing having a passage along a longitudinal axis for receipt of the pipe and having a slot extending from the periphery of the housing to the passage to permit the housing to be moved radially onto the pipe;
    (b) a plurality of magnets within the housing and contiguously arranged side by side from one side of said slot around the pipe to the other side of the slot, all of said magnets being identically, additively polarized;
    (c) a magnet body slidable into the slot and including a magnet which is polarized like and contiguous to the other magnets after being positioned in the slot.

2. An improved apparatus for magnetically treating liquid flowing through a pipe to reduce subsequent crystalization of inorganic compounds in the liquid, said apparatus comprising:

(a) a housing having a passage along a longitudinal axis for receipt of the pipe and having a slot extending from the periphery of the housing to the passage to permit the housing to be moved radially onto the pipe, said slot formed to include a keyway extending generally longitudinally of the pipe;

(b) a plurality of magnets within the housing and contiguously arranged side by side from one side of said slot around the pipe to the other side of the slot, all of said magnets being polarized radially of the pipe and all having like poles centrally facing; and (c) a key magnet body slidable longitudinally in said keyway and restrained by the keyway against radial movement, said key magnet matingly received in said keyway and including a magnet which is polarized like and upon insertion in the keyway is contiguous to the other magnets so that the magnets contiguously encircle the pipe.

3. An apparatus in accordance with claim 2 wherein said housing includes an outer peripheral shell which terminates at said slot, and wherein a void is provided in the housing extending outwardly in opposite directions from the slot to form the keyway.

4. An apparatus in accordance with claim 3 wherein an end plate is attached to the peripheral shell and extends across it except for the slot and passage.

5. An apparatus in accordance with claim 4 wherein said peripheral shell is generally circular and said magnets each have a width substantially equal to the diameter of the pipe oriented circumferentially of the pipe.

6. An apparatus in accordance with claim 3 wherein said shell comprises a ferromagnetic material.

* * * * *